(12) United States Patent
Cho et al.

(10) Patent No.: US 6,633,558 B1
(45) Date of Patent: Oct. 14, 2003

(54) DEVICE AND METHOD FOR CONTROLLING CHANNEL ACCESS BY ACCESS SLOT RESERVING IN A MOBILE COMMUNICATION SYSTEM

(75) Inventors: Dong-Ho Cho, Seoul (KR); Seong-Soo Park, Seoul (KR); Sun-Mi Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/333,189

(22) Filed: Jun. 14, 1999

(30) Foreign Application Priority Data

Jun. 13, 1998 (KR) .............................. 98-22218

(51) Int. Cl.[7] .............................. H04B 7/212; H04J 3/00
(52) U.S. Cl. ........................ 370/348; 370/345; 370/322
(58) Field of Search ................................ 370/345, 346, 370/347, 348, 322, 443; 455/561

(56) References Cited

U.S. PATENT DOCUMENTS

| | | | | |
|---|---|---|---|---|
| 5,307,348 A | * | 4/1994 | Buchholz et al. | ........... 370/348 |
| 5,598,417 A | * | 1/1997 | Crisler et al. | ............... 370/348 |
| 5,787,080 A | * | 7/1998 | Hulyalkar | .................. 370/348 |
| 6,240,083 B1 | * | 5/2001 | Wright et al. | ................ 370/348 |

FOREIGN PATENT DOCUMENTS

| | | |
|---|---|---|
| JP | 58-218249 | 12/1983 |
| JP | 10-145329 | 5/1998 |

OTHER PUBLICATIONS

Japanese Office Action dated Jan. 28, 2003, issued in a counterpart application, namely, Appln. No. 2000-555318.

* cited by examiner

Primary Examiner—Vivian Chin
Assistant Examiner—Raymond Persino
(74) Attorney, Agent, or Firm—Dilworth & Barrese, LLP (57) ABSTRACT

A channel access control device and method are provided in which a base station reserves a specific access slot for a mobile station when the mobile station has data to transmit which exceeds one frame in length. The base station receives channel access information from the mobile station via a reverse access channel; and examines a length of transmission data, included in the received channel access information, to determine whether the transmission data continues in at least one succeeding frame; and reserves a specific access slot on the reverse access channel for the mobile station via a forward access channel when the data continues in the at least one succeeding frame.

10 Claims, 12 Drawing Sheets

DEVICE AND METHOD FOR CONTROLLING CHANNEL ACCESS BY ACCESS SLOT RESERVING IN A MOBILE COMMUNICATION SYSTEM

PRIORITY

This application claims priority to an application entitled "Method For Controlling Channel Access by Access Slot Reserving in Mobile Communication System and Base Station Device Therefor" filed in the Korean Industrial Property Office on Jun. 13, 1998 and assigned Serial No. 98-22218, the contents of which are incorporated herein by reference.

BACKGROUND OF THE INVENTION

1. Field of the Invention

The present invention relates generally to a communication system, and in particular to a channel access control device and method in a code division multiple access (CDMA) mobile communication system. Specifically, the present invention relates to a channel access where a base station reserves a specific access slot for a mobile station in the event that the mobile station has data to transmit which exceeds one radio frame in length to increase transmission efficiency and system performance.

2. Description of the Related Art

In a mobile communication system, random access to a base station by mobile stations may cause collisions because information about available channels is not exchanged among the mobile stations. As an alternative plan to reduce the probability of collision, an access slot concept has been introduced.

Mobile stations attempt, in sync with a base station, to transmit data according to an access offset in a unit of radio frame for a physical layer. One radio frame includes four offsets, and the collision occurs when two or more mobile stations access the same code with the same offset. Such an offset-unit transmission system is called a slotted ALOHA system, which is typically used in mobile communication system. The slotted ALOHA system allows the mobile stations to have a reduced delay time, and thus, provides a high channel utilization efficiency, as compared with a standard ALOHA system.

More specifically, a mobile station attempts to transmit data referring to an access code for random access and offset information, when there is a signaling message or packet data to transmit to the base station. When a message in a upper layer (i.e., Link Access Control Sublayer (LAC Sublayer) exceeds one frame in a length, the upper layer message is segmented in a unit of radio frame length and corresponding indication bits are added. Upon completion of constructing the radio frames, the mobile station transmits the radio frames to the base station via a specific channel at an offset start time and awaits receipt of an acknowledgement. Upon receipt of data from the mobile station, the base station performs error correction using a cyclic redundancy check (CRC) code to determine whether the received data has an error, and transmits the acknowledgement to the mobile station.

Further, when there are additional data to receive, the base station assembles received data after complete reception of the additional messages. After assembly of the messages, the base station transmits data to the upper layer. Upon receipt of an acknowledgement from the base station, the mobile station transmits additional data or new data after random delay. Upon failure to receive an acknowledgement within a preset time after data transmission, the mobile station retransmits the data.

Figure 1:
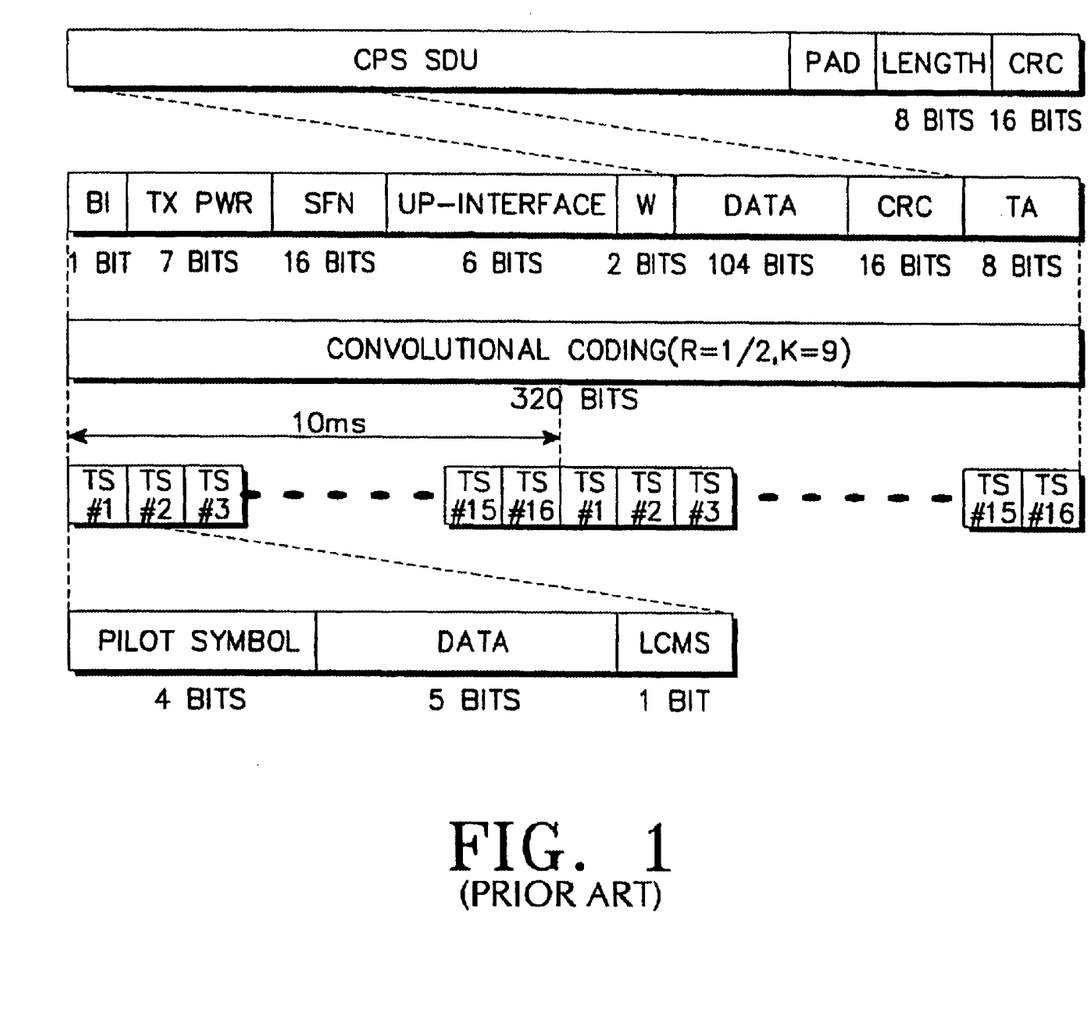
FIG. 1 is a diagram illustrating a frame structure of a prior art Broadcast Control Control Channel.

FIG. 1 is a diagram illustrating a frame structure of a conventional Broadcast Control Channel. A Broadcast Control Channel (BCCH) includes a pair of radio frames, and a BI field indicates whether the frame is a first radio frame or a second radio frame. Further, a TX_PWR field denotes a transmission power of the Broadcast Control Channel; an SFN field denotes a system frame number, which increases by one for every radio frame; a UP_INTERFACE field represents a measured value for a latest reverse interference; a W field indicates whether data is continued in the next frame, in the case where data in a link access control (LAC) sublayer being a upper layer of the MAC layer is segmentally transmitted; a CRC field includes a cyclic redundancy code; and a TA field includes tail bits which are used for initialization of an orthogonal coder. In an IMT-2000 system, for assignment of a signaling channel, a mobile station sends a channel assignment request via a Random Access Channel (RACH), and a base station then sends an acknowledgement for the channel assignment request via a Forward Access Channel (FACH). The Broadcast Control Channel is used when the base station transmits system information to the mobile stations.

Figure 2:
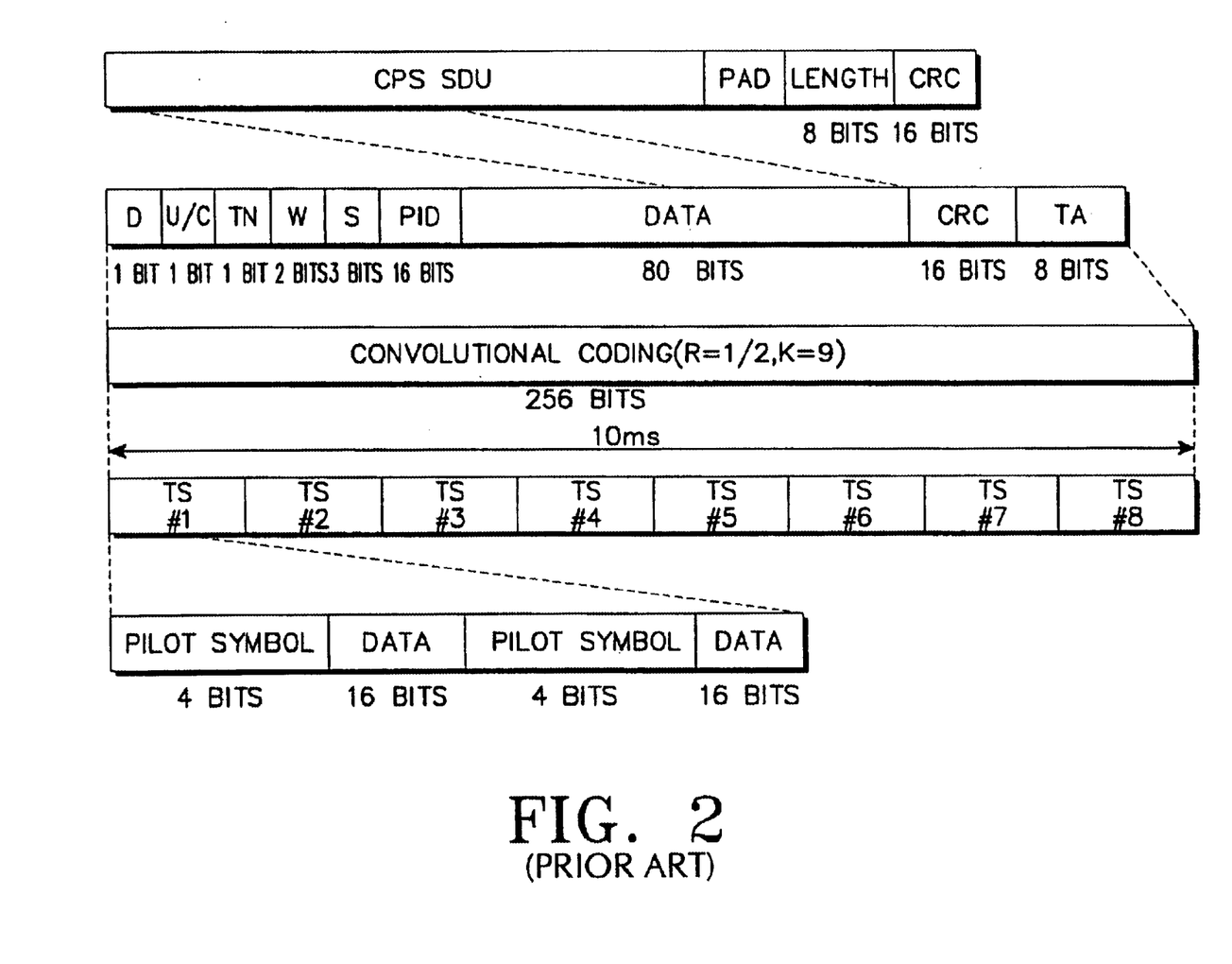
FIG. 2 is a diagram illustrating a frame structure of a prior art Random Access Channel.

FIG. 2 is a diagram illustrating a frame structure of a Random Access Channel. In FIG. 2, a D field denotes a dummy bit; a U/C field indicates whether the frame data is user data or control data; a TN field represents whether the information is used between the base transceiver system (BTS) and the mobile station or between a base station controller (BSC) and the mobile station; an S field includes a sequence number, wherein when the frame has an error according to the CRC checking result, a corresponding sequence number is written in the S field to retransmit the data; and a PID field denotes a packet ID for identification of the mobile station. The Random Access Channel is a physical channel, which is used when the mobile station transmits to the base station, control data for requesting assignment of a dedicated channel and small user packet data without need to establish a dedicated channel.

Figure 3:
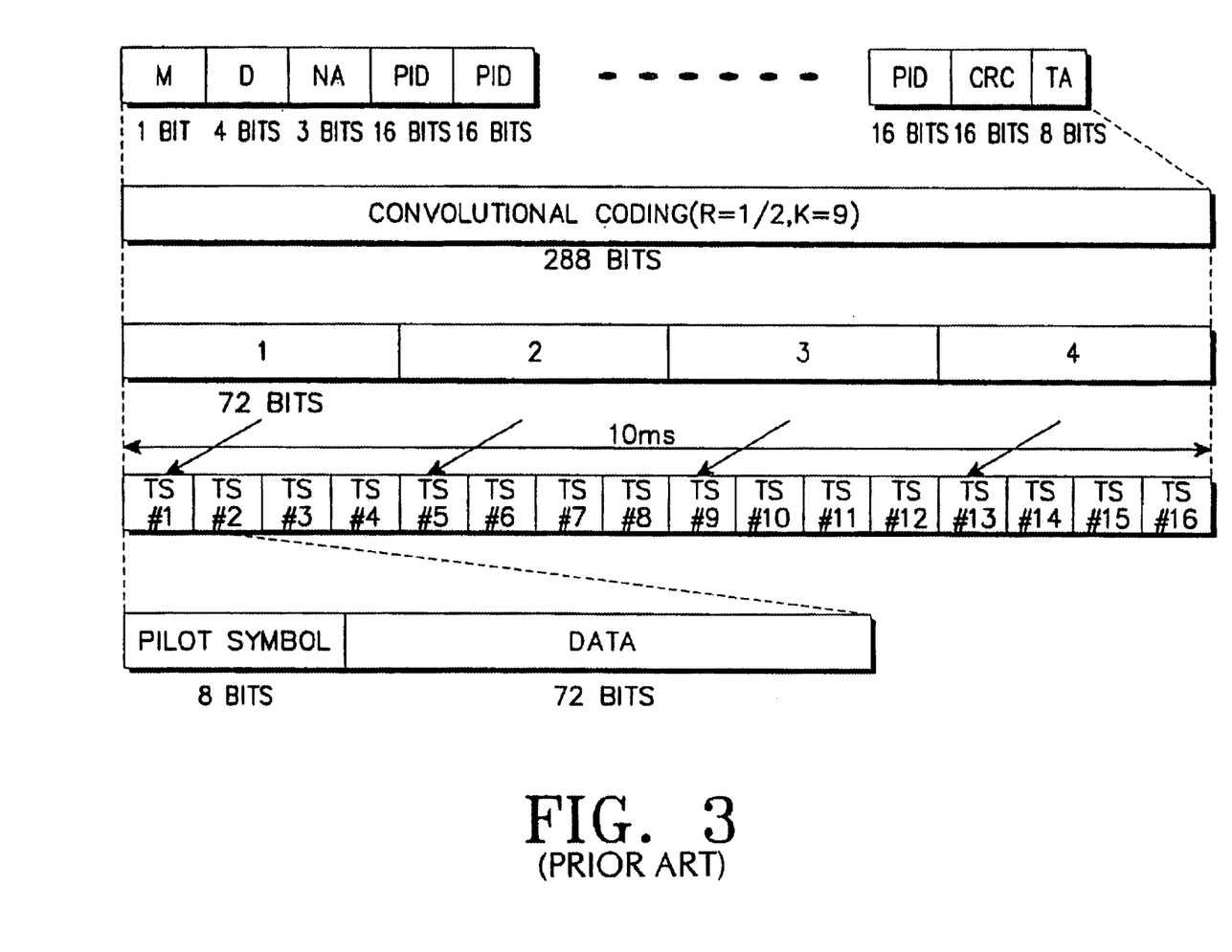
FIG. 3 is a diagram illustrating a frame structure of a prior art Forward Access Channel.

FIG. 3 is a diagram illustrating a frame structure of a conventional Forward Access Channel. In FIG. 3, an NA (the number of ACKs) field denotes the number of ACKs for random access of mobile stations. The Forward Access Channel is a physical channel, which is used when the base station transmits to the mobile station control data or acknowledgement information about random access. As illustrated, a 64K-channel frame is divided into 4 sub-frames each having 16K transmission channels.

Figure 4:
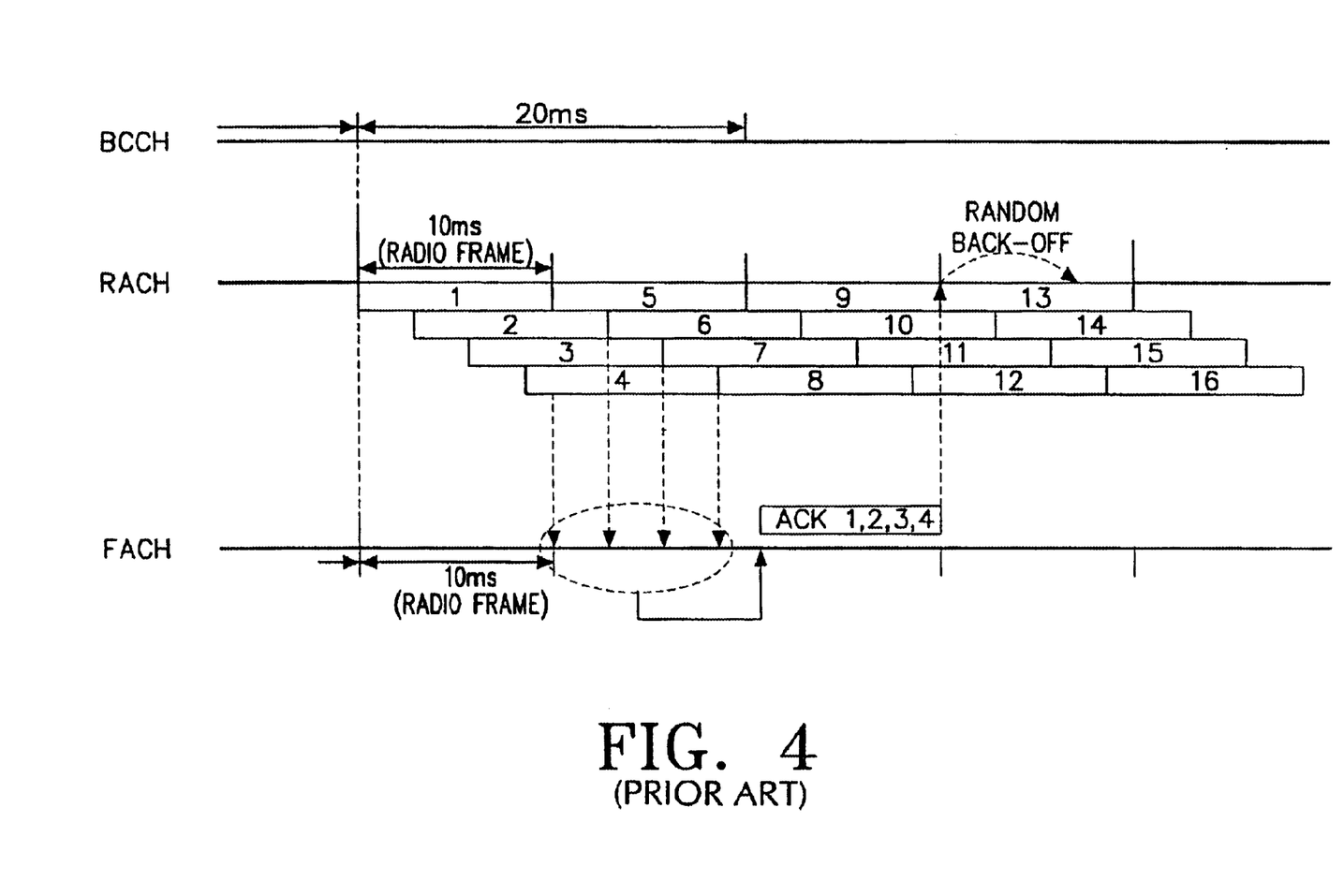
FIG. 4 is a diagram illustrating a channel access procedure via a Random Access Channel (RACH) and a Forward Access Channel (FACH) in a prior art IMT-2000 system.

FIG. 4 is a diagram illustrating a channel access procedure via an RACH and a FACH in a conventional IMT-2000 system. In FIG. 4, "ACK" represents a successful access to the base station by the mobile station; "FACH" denotes a Forward Access Channel; "RACH" denotes a Random Access Channel; and "BCCH" denotes a Broadcast Control Channel.

Referring to FIG. 4, the mobile station is synchronized with the base station. The mobile station then acquires an offset for an RACH to access, and attempts to transmit channel access information via the RACH. In the event that the channel access information transmitted via the RACH is received without collision, the base station notifies the mobile station by transmitting an acknowledgement via the FACH. Upon receipt of the acknowledgement, the mobile station attempts to access the channel again after a random delay. As illustrated, the mobile station transmits data at a 16th access slot after the random delay.

As described above, the slotted ALOHA system does not take into a consideration the event where there is consecutive data to transmit. Therefore, when consecutive data exceeding one radio frame in size is segmented in a unit of radio frame size and then transmitted in random access, transmission of the consecutive data and transmission of new data may be equally managed, thereby causing a transmission delay problem. That is, even for transmission of the consecutive data, a next frame is transmitted with the random delay after an acknowledgement is received for one radio frame. If the consecutive frame and the inconsecutive frame make a contention on an equal basis, transmission of the present frame cannot be guaranteed. In addition, when a packet data service is provided via a common signaling channel, a time delay occurs. That is, even for transmission of the consecutive data, a next frame is transmitted with the random delay after an acknowledgement is received for one radio frame. If the consecutive frame a collision problem, transmission of the upper layer message cannot be guaranteed to be transmitted in present duration. In addition, when a packet data service is provided via a Random Access Channel, long time delay occurs.

SUMMARY OF THE INVENTION

It is, therefore, an object of the present invention to provide a channel access control device and method in a mobile communication system where a base station reserves a specific access slot for a mobile station when the mobile station has data to transmit which exceeds one frame in length to thereby increase transmission efficiency and system performance.

To achieve the above object, there is provided a channel access method for a base station in a mobile communication system. The method includes the steps of (a) receiving channel access information from a mobile station via a reverse access channel; (b) examining a length oftransmission data, included in the received channel access information, to determine whether the transmission data continues in at least one succeeding frame; and (c) reserving a specific access slot on the reverse access channel for the mobile station via a forward access channel when the data continues in the at least one succeeding frame.

There is also provided a channel access method for a mobile station in a mobile communication system. The method includes the steps of (a) receiving access channel reserve information from a system broadcast channel and determining how many access slots on a random access channel are reserved for a next system broadcast channel data transmission duration; (b) receiving reverse confirm information via a forward access channel and determining whether an access slot is reserved for the mobile station for the next system broadcast channel data transmission duration; (c) upon detection of a reserved access channel, transmitting an access channel frame at the reserved access slot on the random access channel; (d) determining whether a response is received from a base station within a first predetermined time; and (e) upon receipt of a response within the first predetermined time, analyzing the response to determine whether an access slot is reserved, and returning to step (c) when an access slot is reserved.

BRIEF DESCRIPTION OF THE DRAWINGS

The above and other objects, features and advantages of the present invention will become more apparent from the following detailed description when taken in conjunction with the accompanying drawings, in which.

DETAILED DESCRIPTION OF THE PREFERRED EMBODIMENTS

A preferred embodiment of the present invention will be described hereinbelow with reference to the accompanying drawings. In the following description, well known functions or constructions are not described in detail since they would obscure the invention in unnecessary detail.

To support a novel channel access mechanism in which an access slot reservation function is introduced to the slotted ALOHA system, a Broadcast Control Channel and a forward access channel should be able to accept access slot reserve information. That is, a base station sends access slot reserve information for a random access channel to a mobile station via the Broadcast Control Channel, and designates a reserved position (i.e., an access slot number) for a random access channel and a corresponding mobile station via the forward access channel.

Figure 5:
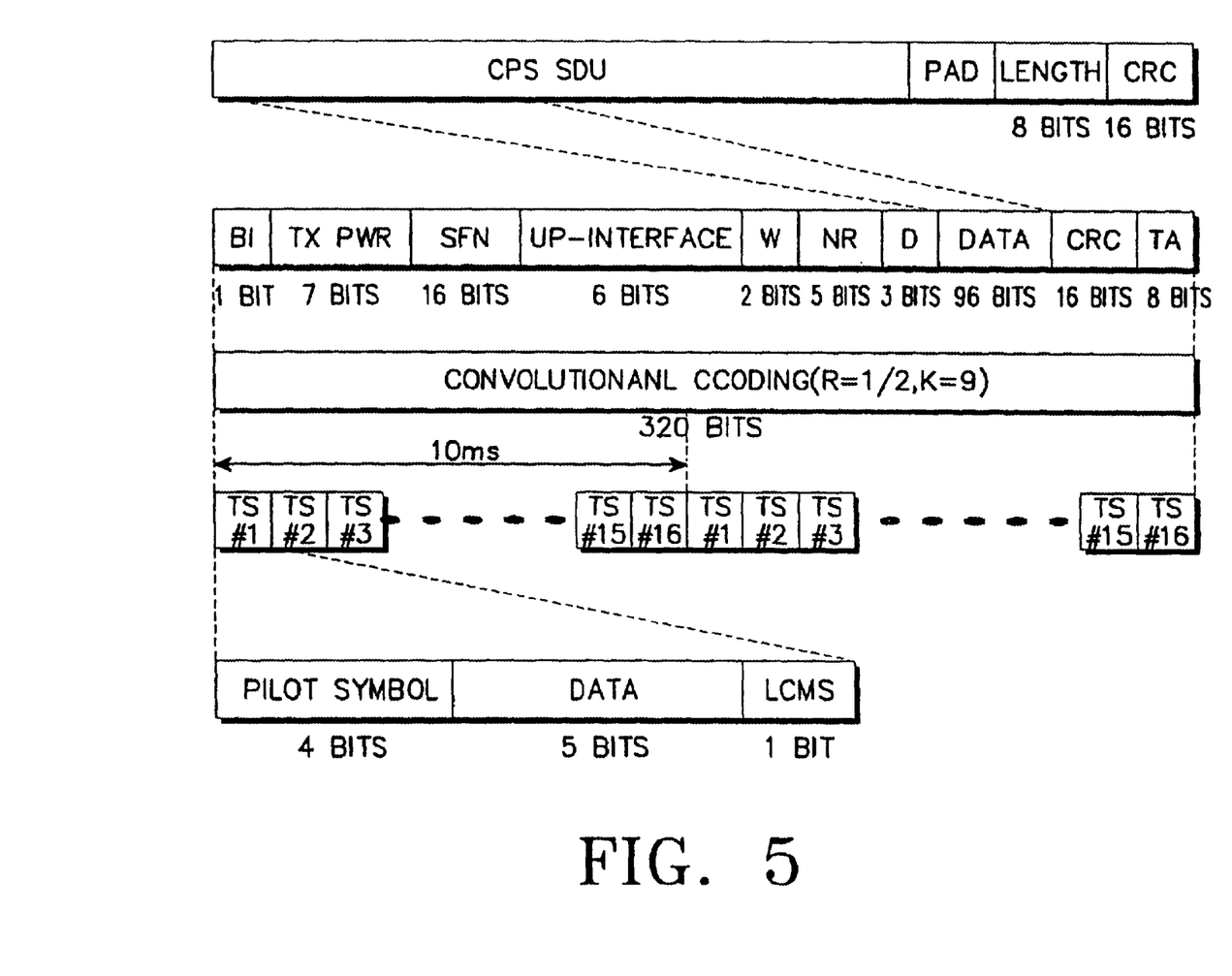
FIG. 5 is a diagram illustrating a frame structure of a Broadcast Control Channel according to an embodiment of the present invention.

FIG. 5 is a diagram illustrating a frame structure of a Broadcast Control Channel according to an embodiment of the present invention. In FIG. 5, an NR field represents the number of reserved access slots among access slots for a random access channel for a next radio frame duration of the Broadcast Control Channel. The base station assigns the access slots sequentially, starting from the beginning of the duration. Therefore, it is possible to know the positions of the access slots in contention even with a value of the NR field.

Figure 6:
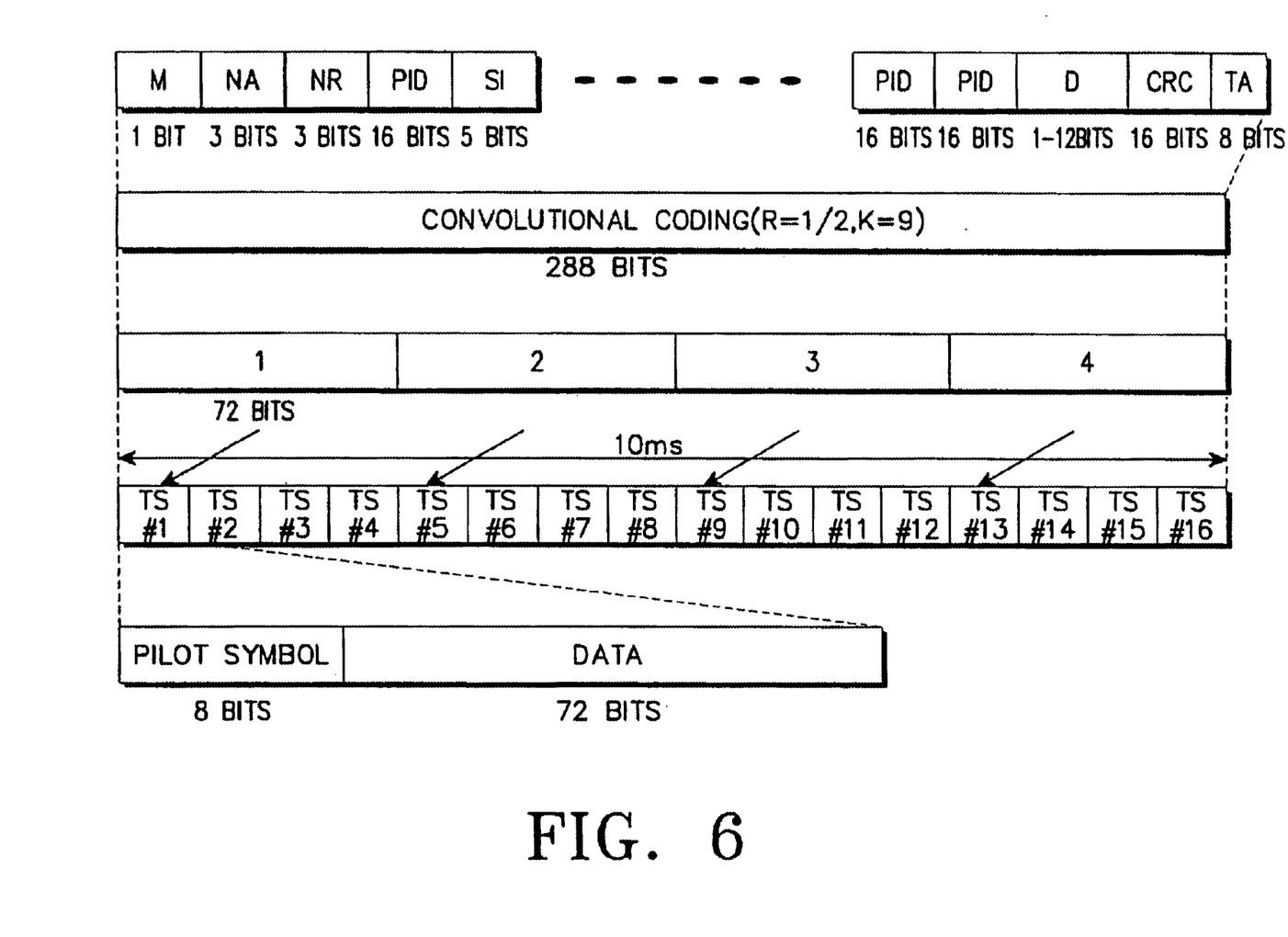
FIG. 6 is a diagram illustrating a frame structure of a forward access channel according to an embodiment of the present invention.

FIG. 6 is a diagram illustrating a frame structure of a forward access channel according to an embodiment of the present invention. In FIG. 6, an NR field represents the number of acknowledgement messages including the reserve information out ofpresent acknowledgement messages; and an SI field represents a position of a reserved access slot for a corresponding mobile station (PID). For example, when a value 5 is written in the NA field and a value 3 is written in the NR field for an acknowledgement message on the forward access channel, it means that access slots are reserved for three mobile stations out of a total of five mobile stations.

The mobile station acquires information about a position of a random access slot from the Broadcast Control Channel, when there is data to transmit. Further, the mobile station determines an access slot to access based on the acquired random access code and an offset value. In this case, an access probability for the mobile stations is calculated according to the number of the reserved access slots and then, compared with a random variable to determine whether to actually access the access slots. Here, the random access probability P can be calculated by:

$$P=1.0-\{(\text{the number of reserved access slots})/(\text{the number of total access slots})\} \quad (1)$$

When the random access probability is zero or when the access is not permissible, access is attempted again after a random back-off delay.

The illustrated 288-bit frame is transmitted for 10 msec. As illustrated, the frame is divided into 16 time slots TS#1–TS#16 after convolutional coding and interleaving and then, transmitted randomly. This process is well known in the art. The reason for dividing the frame into the time slots TS#1–TS#16 is to compensate for a data loss which typically occurs in a radio environment.

Figure 7:
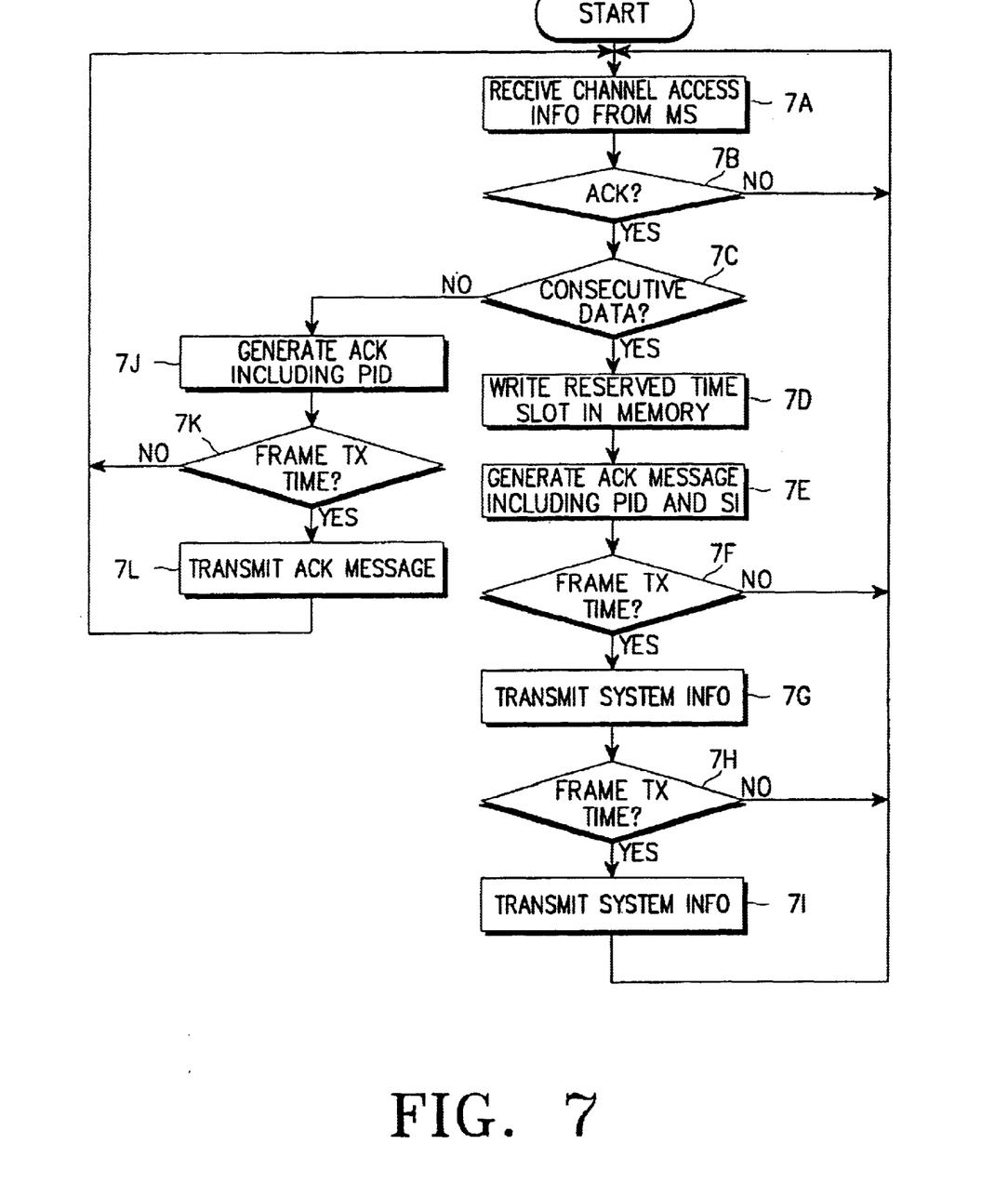
FIG. 7 is a flow chart illustrating how a base station controls channel access from a mobile station according to an embodiment of the present invention.

FIG. 7 is a diagram illustrating a method for controlling channel access from a mobile station to a base sation according to an embodiment of the present invention. The base station determines whether random access data has an error and sends an acknowledgement message according to the termination. Further, the base station maintains access slot reserve information for a random access channel and provides the access slot reserve information to the mobile station.

In step 7a the base station receives channel access information from the mobile station at a predetermined period. For example, the channel access information includes a signaling message for requesting an assignment of a dedicated channel, and short packet data (e.g., short message) which can be transmitted via a reverse access channel without being assigned a dedicated channel. In step 7b, the base station performs error correction using the CRC code included in the received channel access information to judge whether the received channel access information is valid or not, and based on the judgement, determines whether to send an acknowledgment to the mobile station. In step 7c, the base station analyzes the information to determine whether data to be transmitted from the mobile station exceeds one radio frame in length. When the data exceeds one radio frame in length (i.e., consecutive data), the base station selects a specific access slot referring to a reverse memory and stores the selected access slot in the reserve memory as an exclusive access slot for the mobile station, in step 7d. Subsequently, in step 7e, the base station generates an acknowledgment message including access slot-reserved situations (i.e., PID and SI).

After generation of the acknowledgment message, the base station determines in step 7f whether it is a frame transmit time for the forward access channel. When it is not the frame transmit time, the procedure returns to step 7a. Otherwise, when it is the frame transmit time, the base station transmits the acknowledgment message via the forward access channel in step 7g. After transmission ofthe acknowledgment message, the base station determines in step 7h whether it is a frame transmit time for the Broadcast Control Channel. When it is not the frame transmit time, the procedure returns to step 7a. Otherwise, when it is the frame transmit time, the base station transmits system information representing the number of reserved access slots via the Broadcast Control Channel in step 7i. At this time, corresponding information in the reserve memory is updated.

In the meantime, when the data to be transmitted from the mobile station does not exceed one radio frame in length in step 7c (i.e., non-consecutive data), the base station proceeds to step 7j to generate an acknowledgment message including a unique ID (i.e., PID) of the corresponding mobile station. Thereafter, the base station determines in step 7k whether it is a frame transmit time for the forward access channel. When it is not the frame transmit time, the procedure returns to step 7a. Otherwise, when it is the frame transmit time, the base station transmits the acknowledgment message via the forward access channel in step 7l.

Figure 8:
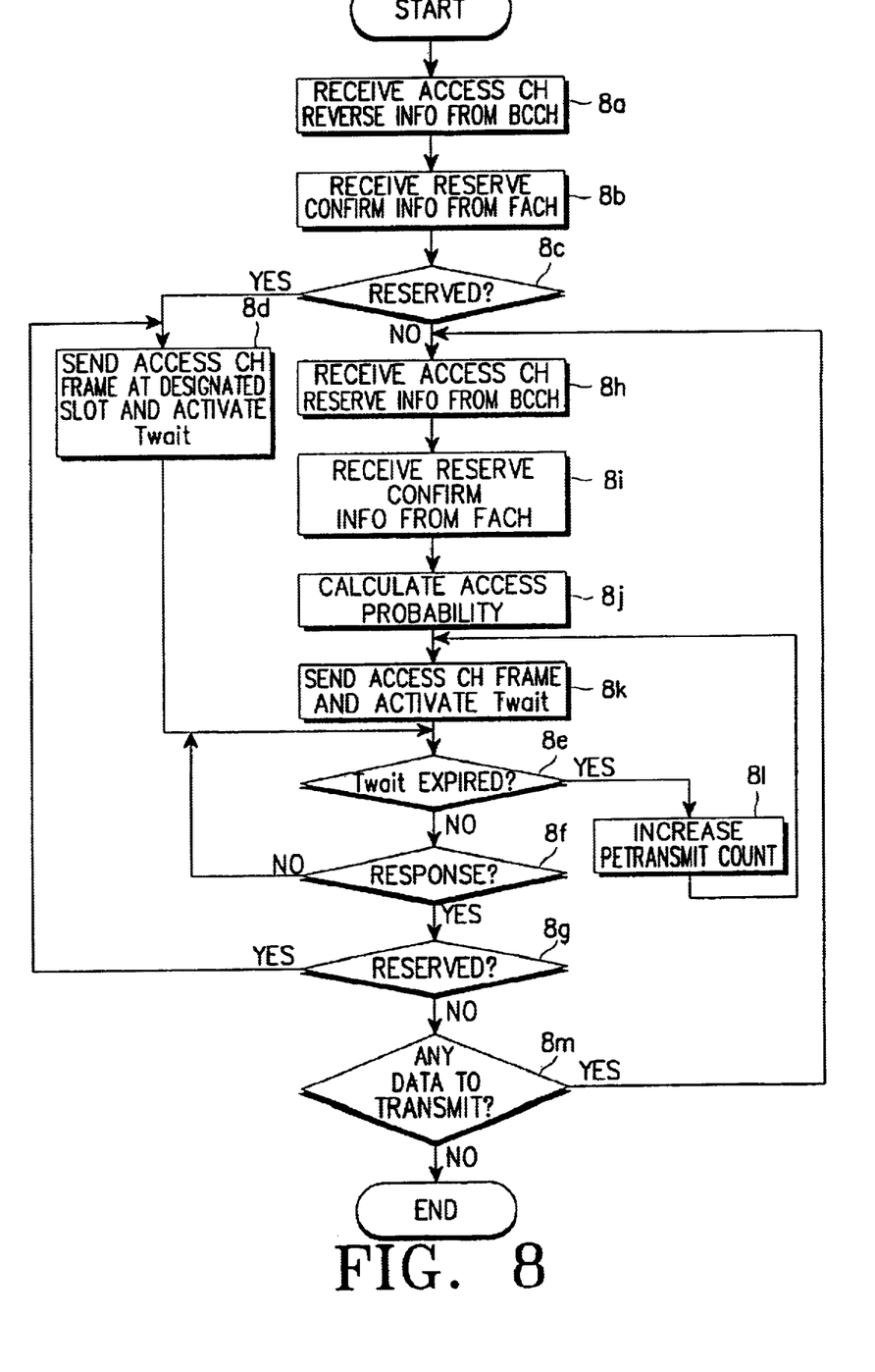
FIG. 8 is a flow chart illustrating a channel access method of a mobile station according to an embodiment of the present invention.

FIG. 8 illustrates a channel access method of a mobile station according to an embodiment of the present invention. In step 8a, a mobile station receives reserve information for an access channel from a Broadcast Control Channel. The reserve information is used to determine how many reserved access slots the random access channel has for the next 20 ms. In step 8b, the mobile station receives, from a forward access channel, reserve confirm information as to whether any access slot is reserved for the mobile station itself.

In step 8c, the mobile station determines whether any access slot is reserved. Upon detection of a reserved access slot, the mobile station proceeds to step 8d to transmit an access channel frame at a designated access slot and activate a wait timer Twait so as to await a response (or acknowledgment) from a base station for the set time.

Thereafter, the mobile, station checks in step 8e whether the wait timer Twait has expired. When the wait timer Twait has not expired yet, the mobile station checks in step 8f whether a response is received from the base station. Upon receipt of the response, the mobile station determines in step 8g whether an access slot is reserved. When an access slot is reserved, the mobile station returns to step 8d.

However, when an access slot is not reserved in step 8c, the mobile station receives the reserve information for the access channel from the Broadcast Control Channel in step 8h. Then, in step 8i, the mobile station receives reserve confirm information for the mobile station itself from the forward access channel in step 8i. Subsequently, the mobiles station calculates an access probability in accordance with Equation (1) in step 8j. After calculation of the access probability, the mobile station transmits an access channel frame at a particular access slot after a lapse of a random delay time and then activates the wait timer Twait, in step 8k. Here, the particular access slot is one of the access slots other than the reserved access slots.

When the wait timer Twait expires in step 8e prior to receipt of a response from the base station, the mobile station proceeds to step 8l to increase a retransmit count and then returns to step 8k. A limit of the retransmit count may be set to a predetermined value.

Further, when an access slot is not reserved in step 8g, the mobile station determines in step 8m whether there is any data to transmit. When there is data to transmit, the mobile station returns to step 8h. As noted from the foregoing, there may be a case where an access slot is not reserved according to a channel condition, even though there is data to transmit. If it is determined in step 8m that there is no data to transmit, the mobile station ends the routine.

Figure 9:
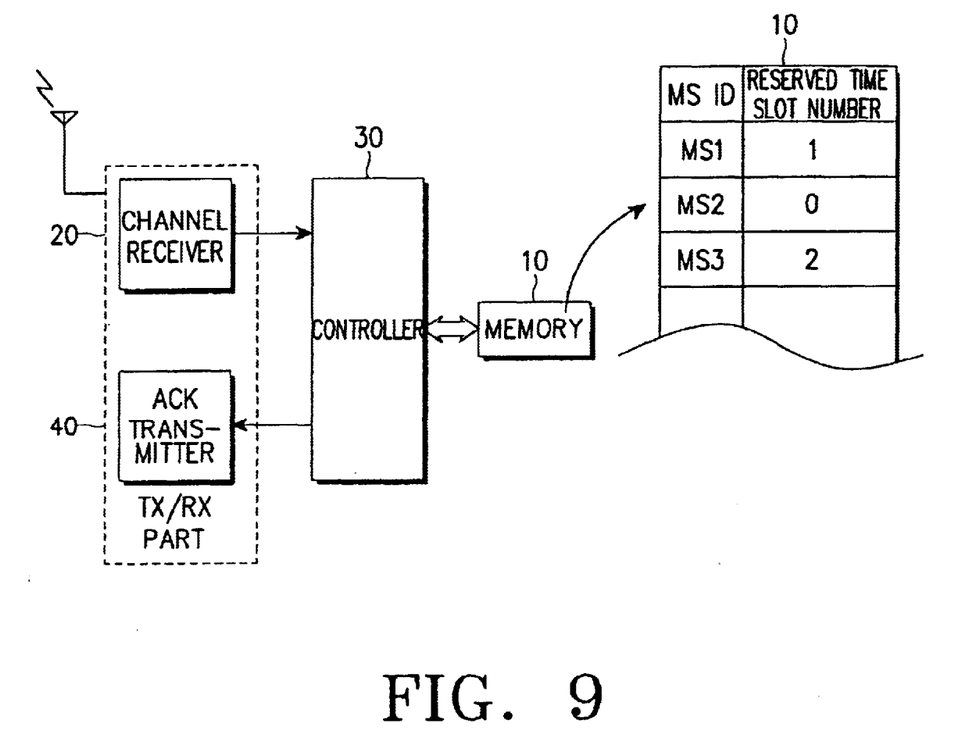
FIG. 9 is a block diagram illustrating a base station device for controlling channel access from a mobile station according to an embodiment of the present invention.

FIG. 9 is a diagram illustrating a base station device for controlling channel access from a mobile station according to an embodiment of the present invention. A memory 10 stores the access slot-reserved situations (information) such as a unique ID (i.e., PID) of the mobile station, and reversed access slot numbers for the respective mobile stations or unreserved codes. A channel receiver 20 receives channel access information from the mobile station at a predetermined offset period. A controller 30 analyzes the received channel access information to determine whether data to be transmitted from the mobile station exceeds one frame in length. When the data exceeds one frame in length, the controller 30 selects a specified access slot and stores the selected access slot in the memory 10 as an exclusive access slot for the mobile station and generates an acknowledgment message including the access slot reserved situation. An acknowledgment transmitter 40 transmits the acknowledgment message generated by the controller 30 to the mobile station.

For example, in the memory 10 of FIG. 9, an access slot number 1 and an access slot number 2 are reserved for first and third mobile stations MS1 and MS3, respectively, but there is no access slot reserved for a second mobile station MS2.

Figure 10:
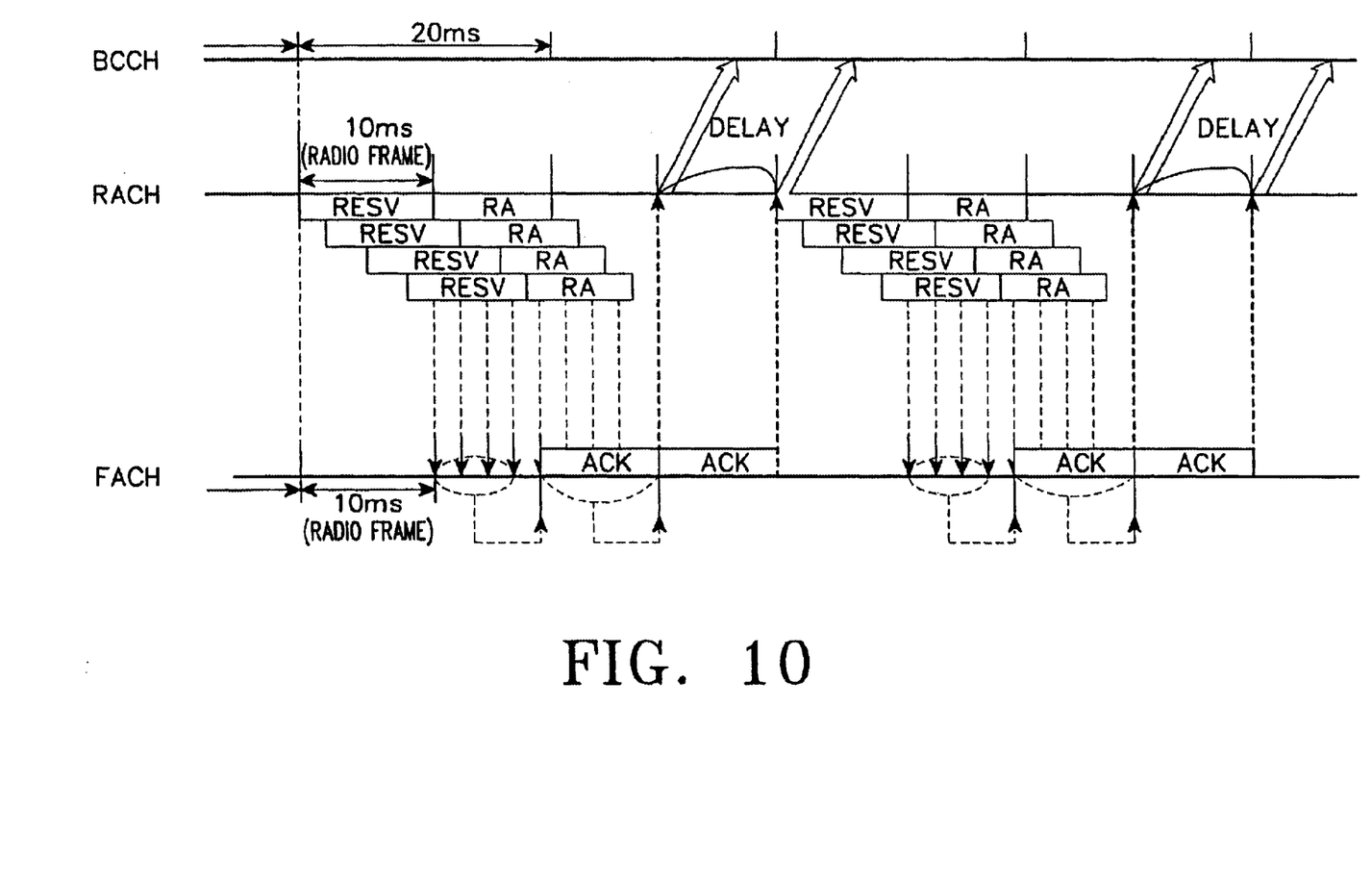
FIG. 10 is a diagram illustrating a channel access procedure according to an embodiment of the present invention.

FIG. 10 is a diagram illustrating a channel access procedure according to an embodiment of the present invention. In FIG. 10, "RESV" denotes a reserved access slot; "RA" denotes an access slot that the mobile stations can use on a contention (or competition) basis; "ACK" denotes a successful access from the mobile station; "DELAY" denotes a delay time required when a random access channel reaches to the base station; "FACH" denotes a forward access; "RACH" denotes a Random Access Channel; and "BCCH" denotes a Broadcast Control Channel, through which the number of reserved access slots for random access for the next 20 ms duration are notified to the mobile station. Further, in an acknowledgment mode for the FACH, the base station transmits position information about the access slot assigned in response to a request received at a contention-based access slot for the RACH. Therefore, only when the respective mobile stations first transmit data is the data transmitted at one of the contention-based access slots for the RACH; thereafter, the consecutive data is transmitted on an access slot reserving basis.

Figure 11:
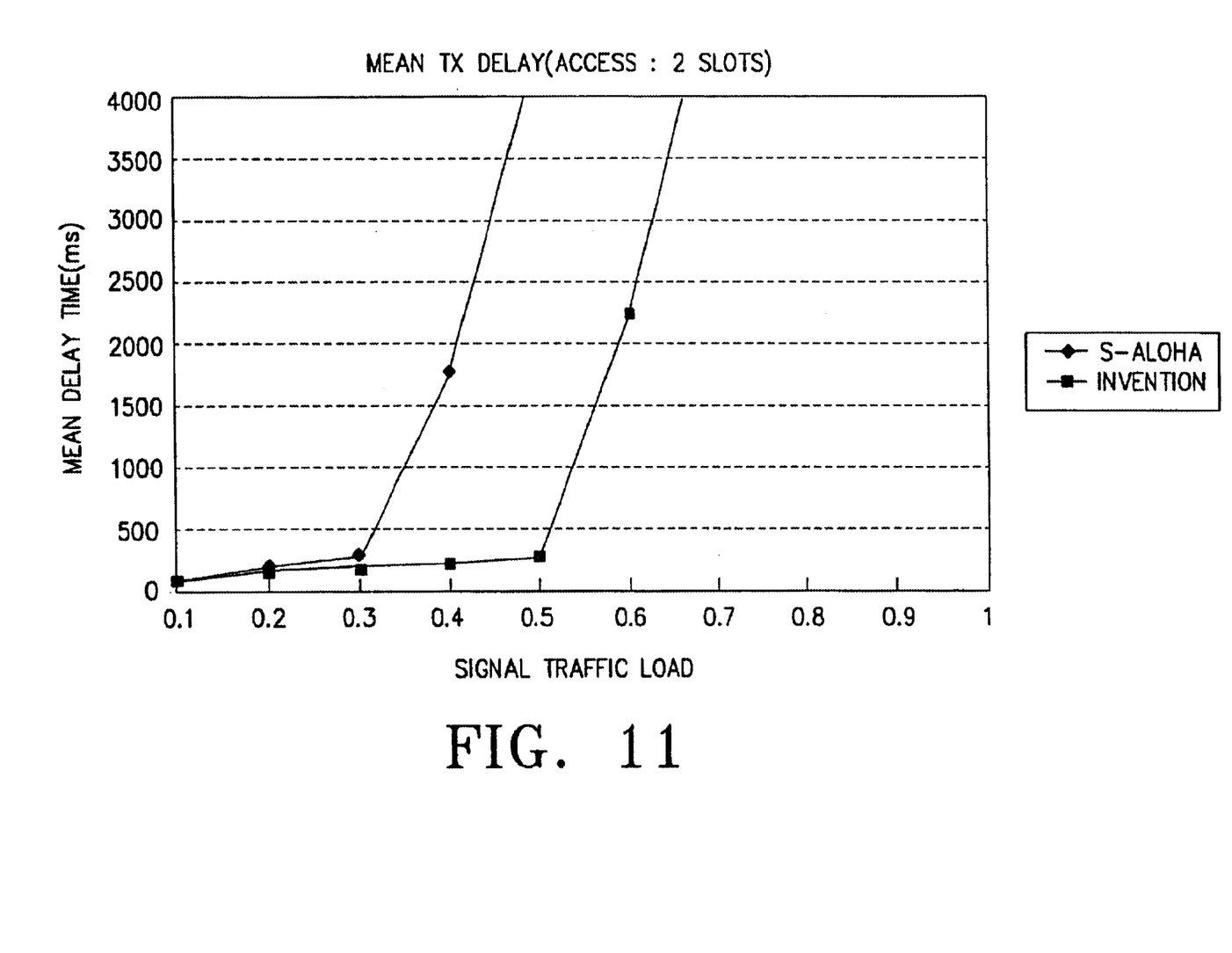
FIG. 11 is a diagram illustrating a comparison of a mean transmission delay between a slotted ALOHA system and the present invention.

FIG. 11 is a diagram illustrating a comparison of a mean transmission delay between the slotted ALOHA system and the present invention. As illustrated, a maximum permissible access value is given when a signal traffic load (or probability) is 0.1, and the access is almost impossible when the signal traffic load is 1. When the signal traffic load is 0.25, the conventional slotted ALOHA system has a mean delay time of about 400 msec, whereas the novel system combined of the slotted ALOHA system and the access slot reserving system has a mean delay time of approximately 150 msec.

Figure 12:
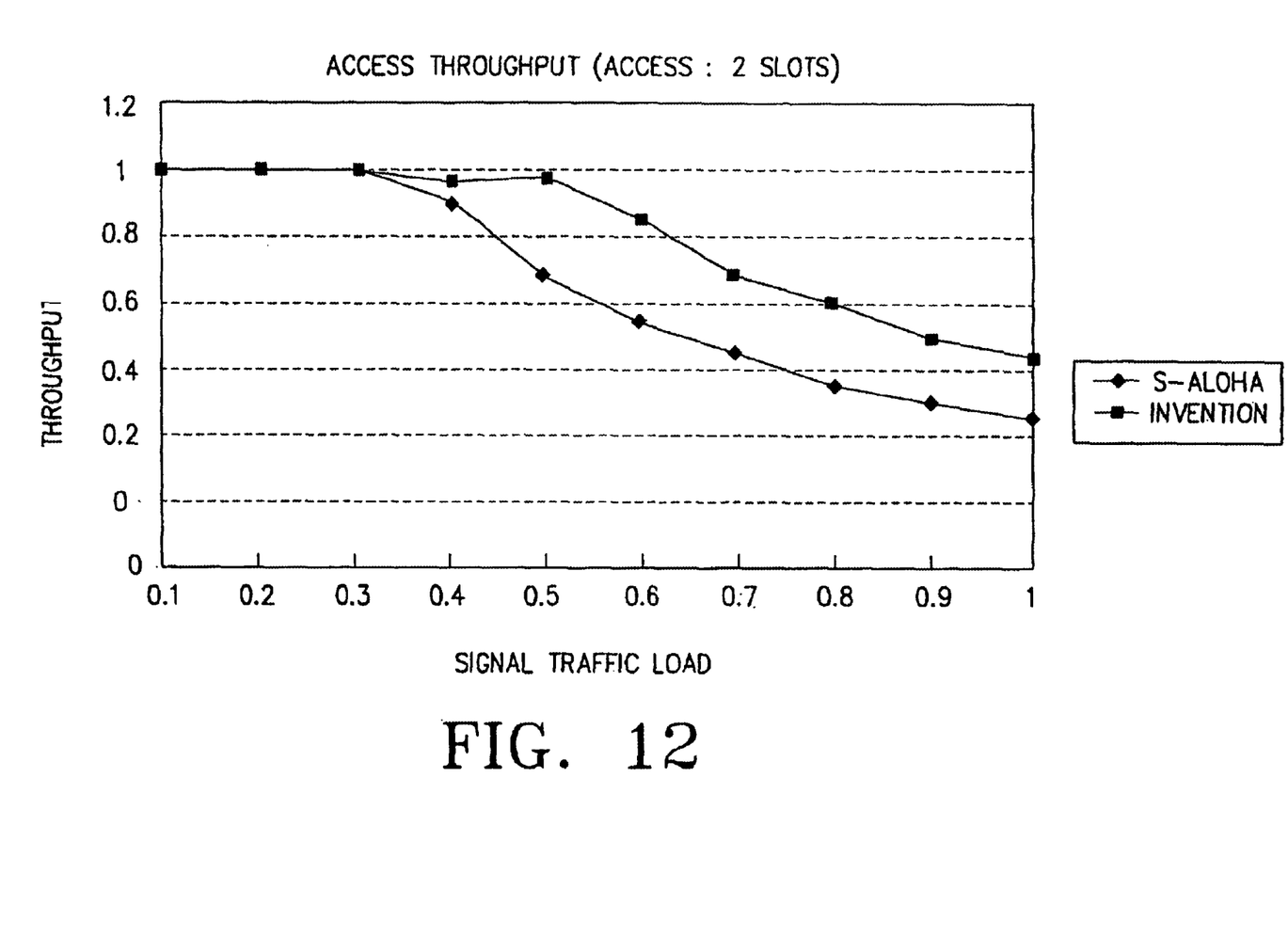
FIG. 12 is a diagram illustrating a comparison of a mean message throughput between the slotted ALOHA system and the present invention.

FIG. 12 is a diagram illustrating a comparison of a mean message throughput between the slotted ALOHA system and the present invention. From the fact that a message throughput is high for the light traffic load, the novel system combined of the slotted ALOHA system and the access slot reserving system has a higher mean message throughput than that of the conventional slotted ALOHA system. As illustrated, when the signal traffic load is 0.8, the conventional slotted ALOHA system has a mean message throughput of about 0.37, whereas the novel method combined of the slotted ALOHA system and the access slot reserving system has a mean message throughput of about 0.6.

The novel method has an improvement of 20–30% in performance when data comprised of two or more consecutive radio frames is transmitted with a traffic load being over 0.5. Thus, the novel method can be effectively used for data transmission via a common channel.

That is, the novel method combined of the slotted ALOHA system and the access slot reserving system operates in the same manner as the conventional slotted ALOHA system when data is carried by one radio frame. However, when data is carried by two or more consecutive radio frames, the data is transmitted in the novel method combined of the slotted ALOHA system and the access slot reserving system much more efficiently thereby, increasing system performance.

As described above, when data is carried by two or more consecutive radio frames, the novel method has a higher transmission efficiency than the existing slotted ALOHA system. Therefore, a mobile station can transmit packet data via a common channel or Random Access Channel with less delay time.

While the invention has been shown and described with reference to a certain preferred embodiment thereof it will be understood by those skilled in the art that various changes in form and details may be made therein without departing from the spirit and scope of the invention as defined by the appended claims.

What is claimed is:

1. A channel access method for a base station in a mobile communication system, comprising the steps of:
   (a) receiving channel access information from a mobile station via a reverse access channel;
   (b) examining a length of transmission data, included in the received channel access information, to determine whether the transmission data continues in at least one succeeding frame; and
   (c) transmitting an acknowledge message including an access slot number which is not currently assigned for other mobile stations via a forward access channel for reservation of the succeeding frame when the examination of the length of transmission data indicates succeeding frame data.

2. The channel access method as claimed in claim 1, further comprising the step of:
   (d) transmitting information about a number of reserved access slots via a Broadcast Control Channel at every transmission time for the reverse access channel.

3. The channel access method as claimed in claim 1, wherein step (b) comprises the steps of:
   (b1) storing access slot number of the access slot to be used by the mobile station in a memory; and
   (b2) at a forward access channel frame transmit time, reading the stored access slot number, and generating the acknowledge message including the access slot number.

4. A channel access method for a mobile station in a mobile communication system, comprising the steps of:
   (a) receiving access channel reserve information from a Broadcast Control Channel and determining how many access slots on a random access channel are available;
   (b) transmitting via an available access slot an access message including transmission data that provides information to the base station relating to reservation request for succeeding frame data;

(c) receiving an acknowledge message including a reserving access slot number via a forward access channel when the base station determines that the access message from the mobile station indicates succeeding frame data; and (d) upon detection of a reserved access channel, transmitting an access channel frame at the reserved access slot.

5. The channel access method as claimed in claim 4, further comprising the steps of:

(e) upon failure to receive the acknowledge message within a first predetermined time, sending an access channel frame at a given access slot after a lapse of a random delay time.

6. A channel access device for a base station in a mobile communication system, comprising:

means for receiving channel access information from a mobile station via a reverse access channel;

means for examining a length of transmission data, included in the received channel access information, to determine whether the transmission data continues in at least one succeeding frame; and means for transmitting an acknowledge message including an access slot number which is not currently assigned for other mobile stations via a forward access channel for reservation of the succeeding frame when the examination of the length of transmission data indicates succeeding frame data.

7. The channel access device as claimed in claim 6, further comprising:

means for transmitting information about a number of reserved access slots via a Broadcast Control Channel at every transmission time for the reverse access channel.

8. The channel access method as claimed in claim 6, wherein said means for examining comprises:

means for storing access slot number of the access slot to be used by the mobile station in a memory; and means for reading the stored access slot number, and generating the acknowledge message including the access slot number at a forward access channel frame transmit time.

9. A channel access device for a mobile station in a mobile communication system, comprising:

means for receiving access channel reserve information from a Broadcast Control Channel and determining how many access slots on a random access channel are available;

means for transmitting via an available slot an access message including transmission data that provides information relating to reservation request for succeeding frame data;

means for receiving an acknowledge message including a reserving access slot number via a forward access channel when the base station determines that the access message from the mobile station indicates succeeding frame data; and means for transmitting an access channel frame at the reserved access slot upon detection of a reserved access channel.

10. The channel access device as claimed in claim 9, further comprising:

means for sending an access channel frame at a given access slot after a lapse of a random delay time upon failure to receive the acknowledge message within a first predetermined time.

* * * * *